March 15, 1932.  E. A. FORSBERG  1,849,665
PULSATOR FOR MILKING MACHINES
Filed March 7, 1928
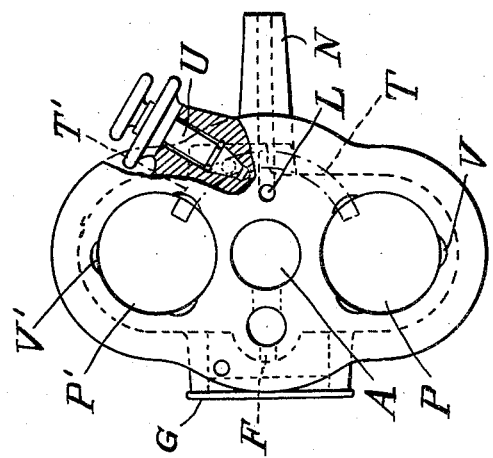
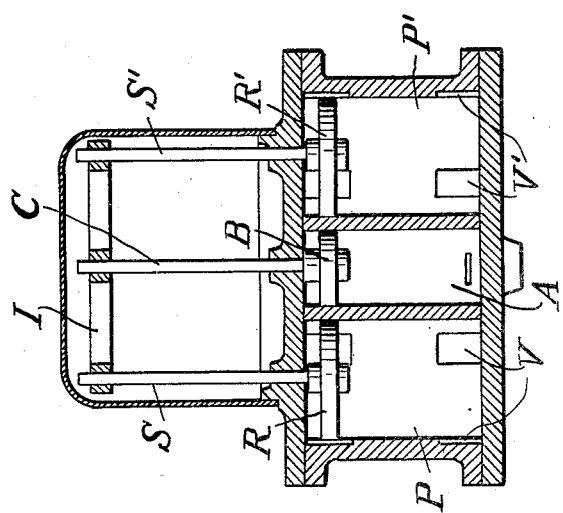
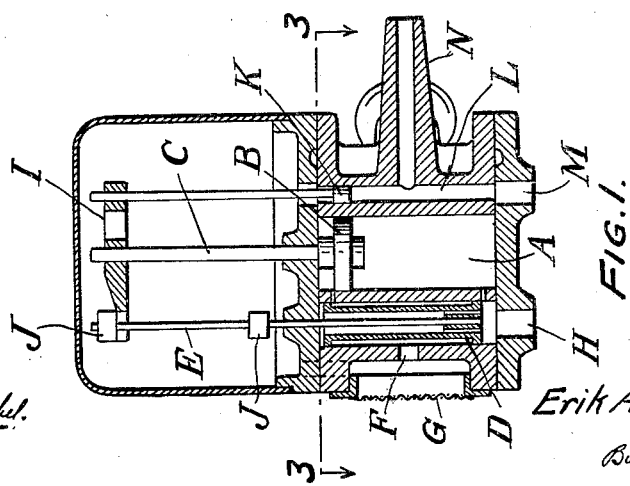
INVENTOR
Erik August Forsberg
BY
Busser and Harding
ATTORNEYS.
WITNESS:
Robt R Mitchell Patented Mar. 15, 1932

1,849,665

UNITED STATES PATENT OFFICE

ERIK AUGUST FORSBERG, OF STOCKHOLM, SWEDEN, ASSIGNOR TO THE DE LAVAL SEPARATOR COMPANY, OF NEW YORK, N. Y., A CORPORATION OF NEW JERSEY

PULSATOR FOR MILKING MACHINES

Application filed March 7, 1928, Serial No. 259,875, and in Sweden March 8, 1927.

For producing the variations in the air pressure by means of which the milking is carried out in vacuum milking machines, valve actuating pulsators are used. They can be of very varying types, but a commonly used construction principle is that a piston, membrane or the like is moved to and fro under the influence of a vacuum, thereby alternately opening and closing pipes and channels for full atmospheric pressure and vacuum. The pulsation speed is thereby regulated by greater or smaller throttling of the channels through which the air flows.

An inconvenience with these apparatus is that the pulsation speed cannot be kept constant, which is, however, necessary for a good milking effect. The air passing through the pulsator can easily, even if it has passed a strainer, contain small particles of dust or the like, which more or less clog up the fine passages and thereby change the working speed. The pulsators are also influenced by the larger or smaller quantity of milk which is taken out at a given moment, so that the pulsation speed increases when the quantity of milk sinks, which irritates the cow much and therefore has an unfavourable influence on the result of the milking.

It also often occurs that pulsators of this type stop working, which can cause serious injury to the cow.

The object of the present invention is to provide a pulsator which works quite reliably and with very small variations in the speed. The invention is shown in an embodiment in the accompanying Figures 1, 2, and 3.

A is a cylinder in which the piston B can move, which latter is connected to a piston rod C. The cylinder is provided with a slide valve D, which is connected to the slide valve rod E. The space around the slide valve communicates with the atmosphere through the hole F and the strainer G, whereas the spaces at the ends of the slide valve communicate with a vacuum through the passage H. The piston rod C is provided with a cross piece I, which, when the piston is approaching its end positions, comes into touch with two stops J on the slide valve rod E. Hereby the slide valve is reversed and an oscillating movement of the piston is obtained. Of course, also other kinds of slide valve regulating devices can be used, but the one mentioned is very suitable on the ground of its simplicity and reliability.

The piston rod is also connected to another piston or valve K, which regulates the variations in the air pressure at the milking organs. This valve is arranged in different ways according to the construction of these milking organs. In the shown embodiment it has been presumed that the milking organs are arranged in such a way that they are alternately influenced by atmospheric pressure and vacuum for equally long periods. The regulating valve consists then simply of the piston K, which moves to and fro in the cylinder L. At one end of the piston full atmospheric pressure prevails, whereas at the other end vacuum prevails through the passage M. The cylinder is fitted with the tube nipple N, from which a tube runs to the milking organ. When the piston K is at one side of the tube nipple N, atmospheric pressure prevails in the latter, and when the piston is at the other side, vacuum is prevailing.

In order to regulate the movement of the piston there are two brake cylinders P, P′, in which the pistons R, R′ move. The piston rods S, S′ connect the pistons to the cross piece I. From one end to the other of the cylinders there are overflow channels T, T′, suitably connected with each other to one system, so that the same pressure always prevails in the two cylinders. The overflow of air can be regulated by means of a throttle screw U or another suitable device in the connecting channel.

The cylinders P, P′ are at their ends provided with recesses V, V′ in the wall, so that, when the piston comes near the end stroke, a free passage is opened between the two sides of the piston.

The device acts in the following manner.

As mentioned above the piston B moves to and fro in the cylinder A. In this movement both the regulating piston K and the brake pistons R, R′ take part. The piston speed, and thus the number of pulsations, is regulated by throttling the overflow channel.

When the pistons come near the end of the stroke, a free passage opens between the two sides of the pistons through the recesses V, V′, and thus a rapid equalization of the pressure takes place. The resistance to the movement of the piston B is thus suddenly reduced considerably, and as the difference in pressure at the two sides of the piston B is still prevailing, a rapid acceleration results. The dimensions can easily be determined in such a way that, in spite of the counter-pressure which occurs during the very last part of the movement of the cylinder A, the piston B moves the whole stroke and reverses the slide valve D.

It should be noted that atmospheric air penetrates only to the slide valve D, the cylinder A and the piston K. The air passes suitably, as mentioned, through a strainer so that coarser impurities are avoided. If fine dust or the like should enter in moderate quantities, this has little influence. The passages between the slide valve D and the cylinder A can be given large dimensions, so that there is no danger that they should become blocked. Within the brake cyinders P, P′ one and the same quantity of air circulates. Consequently, if these cylinders are well cleaned when starting the work, there is no danger that the narrow regulating passage should become obstructed, and it is thus very certain that the movement shall continue uniformly and without disturbances.

The only point where the pulsator is in direct connection to the milking organ itself, is the regulating valve K with its tube nipple N. It is evident that the larger or smaller quantity of milk passing through the milking organ cannot have any influence on the work of the apparatus. If, by some inadvertence or accident milk should enter the connection tube intended for air only between the pulsator and the milking organ, nothing worse can happen than that milk penetrates into the cylinder L on the vacuum side of the piston K, where it can cause but insignificant disturbances. On the other hand, both the cylinder A and its slide valve D as well as the brake cylinders P, P′ are absolutely protected against penetration of milk.

The above stated embodiment is of course only to be regarded as an example. One can evidently arrange the cylinders in each other's prolongation, in which case there is no reason to employ more than one brake cylinder. One can also use another fluid than air as braking medium, and especially a low viscous oil may be suitable.

Having now fully described my invention, what I claim and desire to protect by Letters Patent is:

1. A milking machine pulsator comprising a pneumatically operable working member, a valve controlled by said member and adapted to control its pneumatic operation, and a fluid braking device movable by and adapted to regulate the speed of said member, said braking device comprising a reciprocable element and ports arranged to so control the flow of fluid as to impose substantially less fluid resistance to the movement of said element at opposite ends of its stroke than at the mediate part of its stroke, thereby producing a relatively slow movement of said element without a substantial dwell at the ends of its stroke.

2. A milking machine pulsator comprising a pneumatically operable working member, a valve controlled by said member and adapted to control its pneumatic operation, and a fluid braking device movable by and adapted to regulate the speed of said member, said braking device comprising a reciprocable element, a port adapted to permit a relatively restricted flow of fluid to impose a substantial resistance to the movement of said element and another port, operable as said element approaches the end of its stroke, adapted to permit a relatively free flow of fluid to effect a substantial reduction to resistance to movement of said element.

3. A milking machine pulsator comprising a pneumatically operable working member, a valve controlled by said member and adapted to control its pneumatic operation, and a fluid braking device comprising a pair of cylinders on opposite sides of the working member, pistons in said cylinders connected and movable with the working member, and ports controlling the flow of air between opposite sides of the pistons of the braking device.

4. A milking machine pulsator comprising a pneumatically operable working member, a valve adapted to control the pneumatic operation of said member, means by which said member actuates said valve, a fluid braking device adapted to offer relatively low resistance to movement when near either end of its movement and relatively great resistance to movement when in intermediate positions, a pipe and a valve operable by said member to produce pneumatic pulsations in said pipe.

5. In a milking machine pulsator comprising a working member, a fluid braking device connected with and operable by said member and comprising means adapted to offer relatively low resistance to movement when near either end of its stroke and relatively great resistance to movement when in intermediate positions.

In testimony of which invention, I have hereunto set my hand, at Stockholm, Sweden, on this 9th day of February, 1928.

ERIK AUGUST FORSBERG.